A. J. STEPHENS.
Ditching Machine.

No. 105,995.

Patented Aug. 2, 1870.

Witnesses

Inventor

United States Patent Office.

ANDREW J. STEPHENS, OF MILFORD, ILLINOIS.

Letters Patent No. 105,995, dated August 2, 1870.

IMPROVED DITCHING-MACHINE.

The Schedule referred to in these Letters Patent and making part of the same

*To all whom it may concern:*

Be it known that I, ANDREW J. STEPHENS, of Milford, in the county of Iroquois and State of Illinois, have invented a new and useful Improvement in Ditching-Machine; and I do hereby declare that the following is a full, clear, and exact description thereof, which will enable others skilled in the art to make and use the same, reference being had to the accompanying drawing forming part of this specification.

Similar letters of reference indicate corresponding parts.

This invention has for its object improvement in ditches, whereby they are made more efficient than they have hitherto been; and The invention consists in the provision of a cutter, so arranged as to assist in guiding the plow; also, in the arrangement of two or more blades, pivoted at one end and vertically adjustable at the other, which are designed to support the side pressure upon the mold-board when the machine is being used to simply clear the ditch of dirt; and in the general combination and arrangement of parts, as hereinafter set forth.

A is the beam, to the forward end of which the draft is applied.

To the rear part of the beam A are attached the upper ends of the standards B, to the lower ends of which is attached a horizontal bar, C, which is plated upon its under and outer sides, to adapt it to serve as a land-side for the machine.

D is the plow-point;

E is the share; and

F is the mold-board, the forward part of which is attached to and supported by the forward standard B.

To the rear end of the mold-board F is attached a vertical bar, bar, G, to which is attached a cross-bar, H, the other end of which is attached to the rear standard B, to support the inward pressure upon the mold-board F.

I is a wing, or a continuation of the mold-board, and is hinged to the rear end of the stationary mold-board F, so that it may be set out or in to push the dirt to a greater or lesser distance.

The inward pressure upon the wing or hinged part of the mold-board is sustained by the arm J, the outer end of which is branched, and hinged or pivoted to, or hooked upon the rear part of the said wing I.

Figure 1:
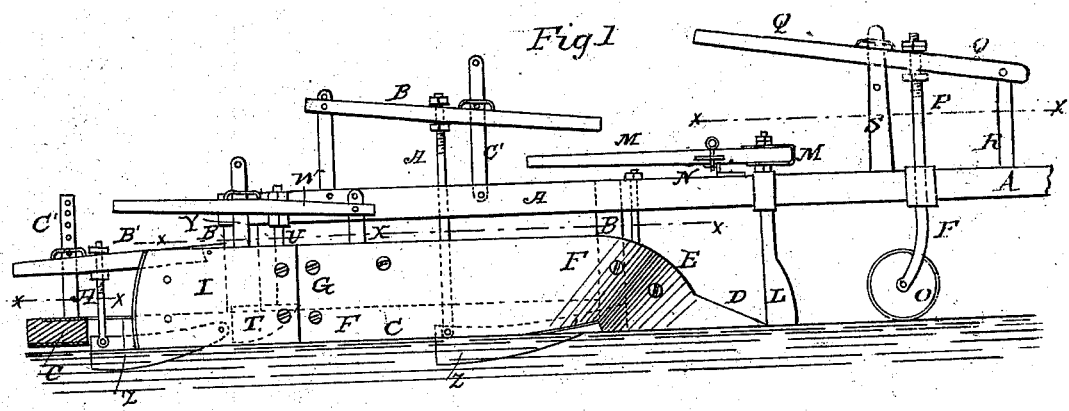
Figure 1 is a side view of my improved machine.
Figure 2:
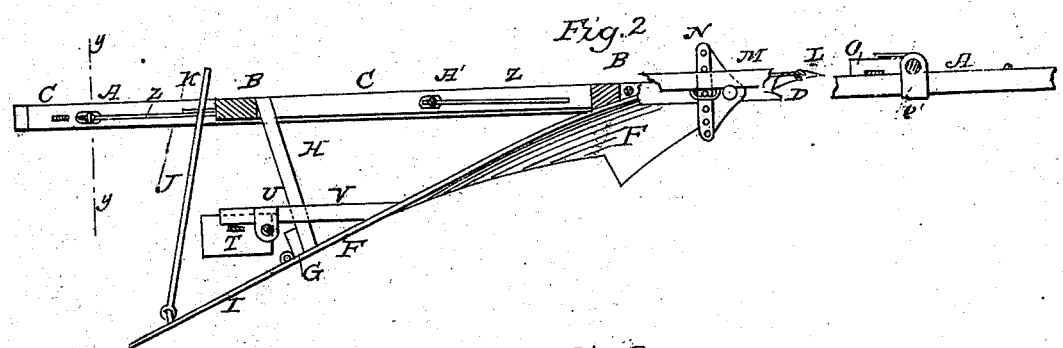
Figure 2 is a detail horizontal section of the same, taken through the irregular line $x\ x$, fig. 1.
Figure 3:
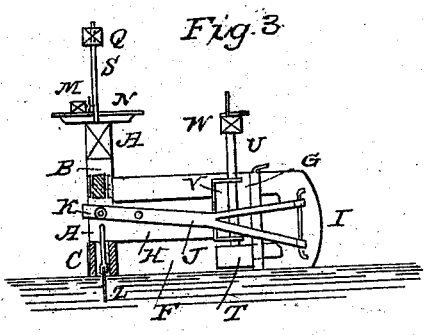
Figure 3 is a rear view of the same, partly in section, through the line $y\ y$, fig. 2.

The inner end of the arm J has several holes formed through it to receive the pin K, projecting from the rear side of the rear standard B, as shown in figs. 2 and 3.

L is the cutter, the shank of which passes up through the beam A, or through a support attached to said beam, and to its upper end is attached a lever, M, so that the cutting-edge of the cutter may be turned toward or from the land-side, as may be desired.

This cutter is used to assist in guiding the machine while being drawn forward upon a straight line, and especially in passing around corners, and describing curves.

The lever M is secured in place, when adjusted, by a pin which passes through the said lever, or a keeper, attached to said lever, and into one or the other of the holes formed in the bar N, attached to the beam A.

The forward end of the machine is supported, and the depth of the cut regulated, by the caster-wheel O, the standard P of which passes up through the beam A, or through a support attached to said beam A, and its upper end is attached to the lever Q, the forward end of which is pivoted to a standard, R, rigidly attached to the forward part of the beam A.

The lever Q is secured in place, when adjusted, by a pin passing through the lever Q, or through a keeper attached to said lever and through one or the other of the holes through the standard S, the lower end of which is secured to the beam A.

The mold-board F is supported upon a caster-slide, T, the standard U of which passes up through the bar V, attached to the brace-bar H and mold-board F, or through a support attached to said bar V, and its upper end is secured to the lever W, the forward end of which is pivoted to the end of the standard X, the lower end of which is attached to the forward part of the bar V.

The lever W is secured in place, when adjusted, by a pin, which passes through the lever W, or through a keeper attached to said lever, and through one or the other of the holes through the standard Y, the lower end of which is secured to the rear end of the bar V.

Z are blades pivoted in vertical longitudinal slots in the land-side C, and which are pivoted to the lower ends of the standards A' A, the upper ends of which are pivoted to the levers B'.

The levers B' are pivoted to the beam A or rear standard B, or to supports attached to said beam or standard.

The levers B' are secured in place, when adjusted, by pins passing through the said levers B', or through keepers attached to said levers, and through one or the other of the holes through the standards C'.

The blades Z are designed to be lowered to enter the ground and support the side pressure upon the mold-board, when the machine is simply used for pushing the dirt back from the ditch. When the machine is used for cutting a furrow, the blades Z are raised into the land-side C.

Having thus described my invention,

I claim as new and desire to secure by Letters Patent—

1. The pivoted cutter L, operated by the lever M, adjustable on the perforated bar N, to act as guide, as shown and described.

2. The blades Z Z, pivoted at their front ends to the fixed standards B, and at their rear ends to the standards A', which are made vertically adjustable with reference to the beam A, by means of the pivoted beams B' and perforated standards C', all as and for the purpose specified.

3. The arrangement, with the beam A, of the caster-wheel O, pivoted guide-cutter L, blades Z, and slide T, with their respective standards and adjusting levers, the plow C F, extension I, and bar J, as shown and described.

ANDREW J. STEPHENS.

Witnesses:
 EZRA BROWN,
 ALEXANDER SLAUGHTER.